(12) United States Patent
Fullmer et al.

(10) Patent No.: US 10,141,829 B2
(45) Date of Patent: Nov. 27, 2018

(54) MULTIPLE POWER TOPOLOGIES FROM SINGLE POWER GENERATOR

(71) Applicant: John Bean Technologies Corporation, Chicago, IL (US)

(72) Inventors: Michael Lynn Fullmer, Roy, UT (US); Kirk Rodney Nelson, Sandy, UT (US)

(73) Assignee: John Bean Technologies Corporation, Chicago, IL (US)

( * ) Notice: Subject to any disclaimer, the term of this patent is extended or adjusted under 35 U.S.C. 154(b) by 147 days.

(21) Appl. No.: 15/197,460

(22) Filed: Jun. 29, 2016

(65) Prior Publication Data

US 2018/0006545 A1 Jan. 4, 2018

(51) Int. Cl.
| | |
|---|---|
| *H02M 1/10* | (2006.01) |
| *H02M 1/08* | (2006.01) |
| *H02J 4/00* | (2006.01) |
| *B64D 41/00* | (2006.01) |
| *H02M 3/335* | (2006.01) |
| *H02M 5/458* | (2006.01) |

(52) U.S. Cl.
CPC .............. *H02M 1/08* (2013.01); *B64D 41/00* (2013.01); *H02J 4/00* (2013.01); *H02M 1/10* (2013.01); *H02M 3/335* (2013.01); *H02M 5/458* (2013.01); *B64D 2221/00* (2013.01)

(58) Field of Classification Search
CPC ..................................................... H02M 1/10
USPC ........................................................ 307/151
See application file for complete search history.

(56) References Cited

U.S. PATENT DOCUMENTS

| | | | | |
|---|---|---|---|---|
| 4,165,795 | A | * | 8/1979 | Lynch ...................... B60K 6/48 180/65.25 |
| 5,485,022 | A | | 1/1996 | Matsuda |
| 5,737,196 | A | | 4/1998 | Hughes et al. |
| 6,320,773 | B1 | | 11/2001 | Urish et al. |

(Continued)

FOREIGN PATENT DOCUMENTS

| | | |
|---|---|---|
| CN | 101898499 A | 12/2010 |
| KR | 10-2016-0010345 A | 1/2016 |

(Continued)

OTHER PUBLICATIONS

International Search Report and Written Opinion dated Nov. 9, 2017, issued in corresponding International Application No. PCT/US2017/039079, filed Jun. 23, 2017, 12 pages.

(Continued)

*Primary Examiner* — Adi Amrany
(74) *Attorney, Agent, or Firm* — Christensen O'Connor Johnson Kindness PLLC

(57) ABSTRACT

A power unit for producing both alternating current and direct current includes a switcher connected to a direct current source, wherein the switcher includes circuitry configured to produce both alternating current having first characteristics and direct current having second characteristics, wherein the circuitry comprises a plurality of insulated gate bipolar transistor circuits and drive circuits connected to the insulated gate bipolar transistor circuits. The switcher may receive variable voltage and frequency or constant voltage and frequency. In either case, the switcher circuitry is able to provide power of the desired characteristics. The power unit may be used to power aircraft when the aircraft is on the ground.

16 Claims, 2 Drawing Sheets

(56) References Cited

U.S. PATENT DOCUMENTS

| | | | |
|---|---|---|---|
| 6,424,891 | B1 | 7/2002 | Sargent et al. |
| 7,461,516 | B2 | 12/2008 | Leadingham et al. |
| 8,030,801 | B2 | 10/2011 | Mann, III et al. |
| 8,339,810 | B2 | 12/2012 | Ratnaparkhi et al. |
| 2006/0201173 | A1 | 9/2006 | Leathers |
| 2008/0250803 | A1 | 10/2008 | Leadingham et al. |
| 2009/0107160 | A1 | 4/2009 | Montminy et al. |
| 2009/0108128 | A1 | 4/2009 | Mann, III et al. |
| 2010/0201197 | A1* | 8/2010 | Shires .................... H02J 1/10 307/73 |
| 2010/0270864 | A1* | 10/2010 | Vyas ...................... H02J 7/35 307/82 |
| 2011/0133573 | A1 | 6/2011 | Ratnaparkhi et al. |
| 2011/0221279 | A1 | 9/2011 | Ratnaparkhi et al. |
| 2013/0279212 | A1 | 10/2013 | Leadingham |
| 2014/0132062 | A1* | 5/2014 | Brombach ............... B64F 1/34 307/9.1 |
| 2014/0265582 | A1 | 9/2014 | Hyppio |
| 2015/0153092 | A1 | 6/2015 | Urbain |

FOREIGN PATENT DOCUMENTS

| | | |
|---|---|---|
| WO | 85/04149 A1 | 9/1985 |
| WO | 2006/093647 A1 | 9/2006 |
| WO | 2015/088338 A1 | 6/2015 |

OTHER PUBLICATIONS

Chapman, S.J., "Electric Machinery Fundamentals," 3d ed., McGraw-Hill Companies, 2001, Chap. 3, "Introduction to Power Electronics," Section 3.6, "Inverters: Pulse-Width Modulation Inverters," pp. 189-195.

Cobanov, N., et al., "High Power Soft-Switching IGBT DC-DC Converter," Automatika—Journal for Control, Measurement, Electronics, Computing and Communications 54(2):178-187, 2013.

"Fuji IGBT Modules Application Manual," REH984c, Fuji Electric Co., Ltd., Mar. 2015, Chap. 1, "Structure and Features," pp. 1-1-1-7.

"Fuji IGBT Modules Application Manual," REH984c, Fuji Electric Co., Ltd., Mar. 2015, Chap. 2, "Technical Terms and Characteristics," pp. 2-1-2-11.

"Fuji IGBT Modules Application Manual," REH984c, Fuji Electric Co., Ltd., Mar. 2015, Chap. 3, "IGBT Module Selection and Application," pp. 3-1-3-7.

"Fuji IGBT Modules Application Manual," REH984c, Fuji Electric Co., Ltd., Mar. 2015, Chap. 7, "Gate Drive Circuit Design," pp. 7-1-7-11.

International Search Report and Written Opinion dated Oct. 4, 2017, issued in corresponding International Application No. PCT/US2017/039442, filed Jun. 27, 2017, 14 pages.

FMC Technologies Inc., "FMC Airport Systems, Jetway Jetpower PWM2, Dual Output, Section 2: 28 VDC Option," Jun. 2004, 1 page.

Written Opinion of the International Preliminary Examining Authority dated Jun. 13, 2018, issued in corresponding International Application No. PCT/US2017/039079, filed Jun. 23, 2017, 4 pages.

Written Opinion of the International Preliminary Examining Authority dated Jun. 29, 2018, issued in corresponding International Application No. PCT/US2017/039442, filed Jun. 27, 2017, 6 pages.

International Preliminary Report on Patentability dated Sep. 13, 2018, issued in International Application No. PCT/US2017/039079, filed Jun. 23, 2017, 11 pages.

* cited by examiner

MULTIPLE POWER TOPOLOGIES FROM SINGLE POWER GENERATOR

BACKGROUND

On-board generators in aircraft provide power to electrical systems of the aircraft generally only when the engines are running. However, there are times and places when running the aircraft engines is not feasible to power the aircraft's electrical systems. Accordingly, ground power units have been developed to provide power to aircraft electrical systems by either connecting to the existing power grid or by utilizing a gas or diesel engine with a generator. Unfortunately, not all aircraft use power having the same characteristics. Common power standards of aircraft electrical systems are 115 V 400 Hz 3-phase AC and 270 V DC, which is obtained by a direct rectification of 115 V AC power.

However, the maintenance of two ground power units for supplying 115 V 400 Hz AC and 270 V DC has obvious disadvantages. Accordingly, it would be desirable to have a ground power unit to provide both 115 V 400 Hz AC power and 270 V DC.

SUMMARY

In some embodiments, a power unit for producing both alternating current and direct current, comprises a switcher connected to a direct current source, wherein the switcher includes circuitry configured to produce both alternating current having first characteristics and direct current having second characteristics, wherein the circuitry comprises a plurality of insulated gate bipolar transistor circuits and drive circuits connected to the insulated gate bipolar transistor circuits.

In some embodiments, the first characteristics include 3-phase, 400 hertz alternating current.

In some embodiments, the second characteristics include 270 V direct current.

In some embodiments, the switcher is connected to a rectifier, wherein the rectifier converts alternating current into direct current supplied to the switcher.

In some embodiments, the power unit comprises a first, second, and third insulated gate bipolar transistor circuit, and the first, second, and third insulated gate bipolar transistor circuits are connected in parallel to a cathode and anode terminal of the rectifier.

In some embodiments, the power unit comprises an interface circuit configured to apply a sinusoid control voltage to each of the insulated gate bipolar transistor circuits, wherein the sinusoid is out of phase 120 degrees between the insulated gate bipolar transistor circuits.

In some embodiments, the power unit comprises an interface circuit configured to generate two pulse wave modulated control voltage outputs which are applied 180 degrees out of phase of each other to two of the insulated gate bipolar transistor circuits.

In some embodiments, the power unit comprises a rectifier connected to the switcher, wherein the rectifier converts alternating current into direct current supplied to the switcher, and a transformer connected to the rectifier.

In some embodiments, the power unit comprises an engine and generator connected to the transformer.

In some embodiments, the engine is a fixed speed engine.

In some embodiments, the engine is a variable speed engine.

In some embodiments, the power unit comprises a gearbox connecting the engine to the generator to increase generator rpms.

In some embodiments, the circuitry comprises a pulse wave modulated inverter.

In some embodiments, the power unit comprises a variable frequency generator.

In some embodiments, generator is configured to vary the voltage from the range of 200 to 300 V.

In some embodiments, the generator is configured to vary the frequency from 380 to 600 Hz.

In some embodiments, the switcher is configured to receive input that varies in voltage or frequency or both voltage and frequency.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
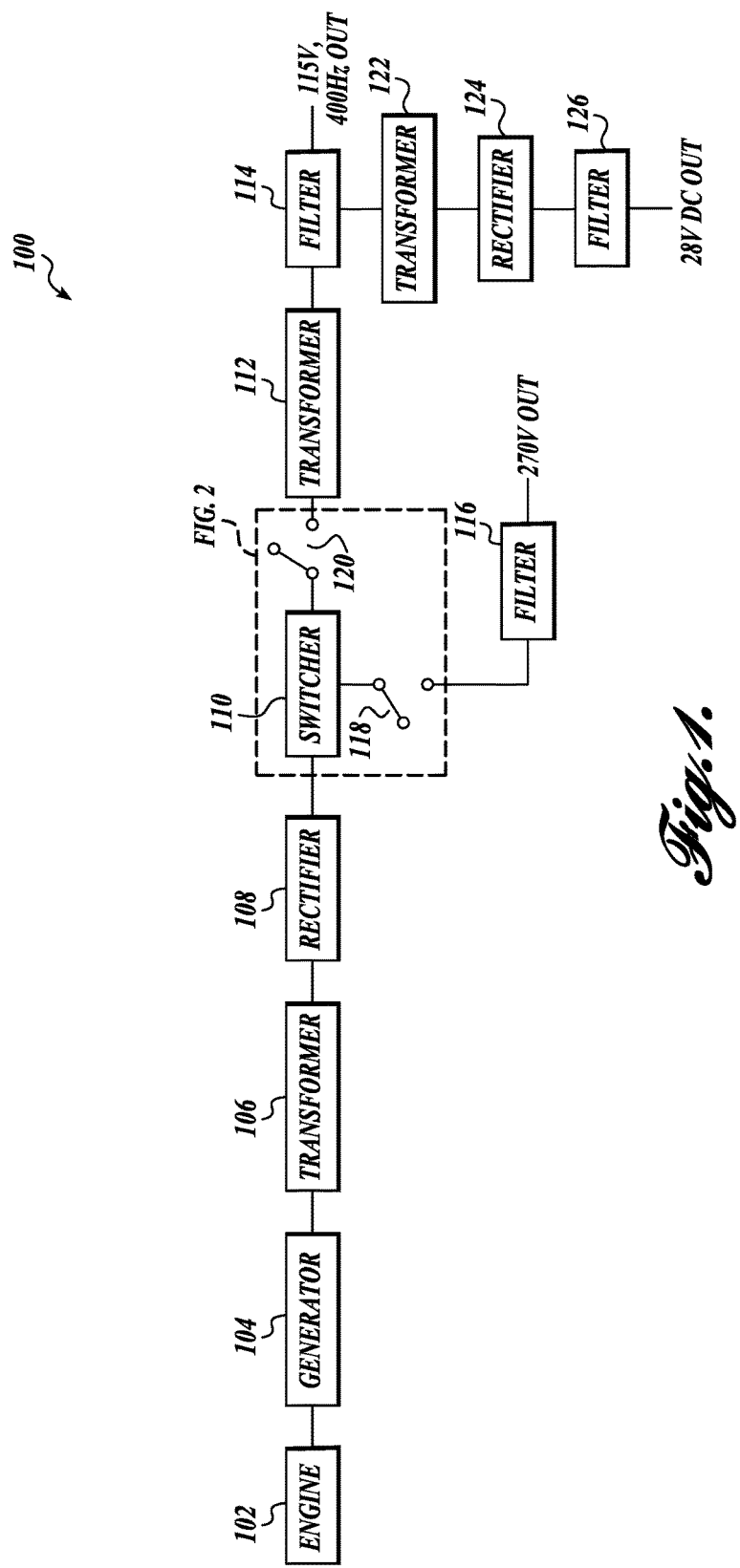
FIG. 1 is a schematic illustration of a ground power unit in accordance with an embodiment.

Referring to FIG. 1, a schematic of an embodiment of a ground power unit 100 ("GPU") capable of producing power of at least an alternating current ("AC") and a direct current ("DC"). In some embodiments, the AC output power is 115/200 V, 400 Hz, 3-phase AC and the DC power output is 270 V DC. However, it is possible based on this disclosure to provide AC and DC power having different characteristics. In accordance with this disclosure, FIG. 1 is a representative ground power unit; however, it is understood that ground power units can include additional components not shown in FIG. 1. In some embodiments, some of the components shown in FIG. 1 can be omitted without affecting the ability to generate the at least one alternating current and the at least one direct current. In some embodiments, some components can be interchanged with one or more components that can perform substantially the same function. Further, while the disclosure gives representative power characteristics for describing certain embodiments, the GPU 100 is not thereby limited. According to this disclosure, the GPU 100 can be programmed to meet any power characteristics in common use in North America, Europe, or of any country. In some embodiments, the GPU 100 can produce both alternating current and direct current of the desired characteristics even when the voltage and frequency supplied by a generator varies.

In some embodiments, the GPU 100 includes a gasoline or diesel powered engine 102 coupled to a generator 104. In some embodiments, the engine 102 can be a fixed speed engine. In some embodiments, the engine 102 can be a variable speed engine. The generator 104 is for producing AC power. In some embodiments, the generator 104 can produce a constant voltage and a constant frequency, such as when the engine 102 is a single speed engine. In some embodiments, the generator 104 can be a variable voltage/variable frequency generator and produce a varying voltage and frequency. Being able to vary the voltage and/or the frequency with a variable voltage/variable frequency generator 104 can be beneficial in order to power various of the aircraft's electrical loads. A variable frequency generator can eliminate the need for a fixed speed engine, as the generator 104 is allowed to rotate at a variable speed. Through the use of conversion circuitry, the variable frequency generator 104 will be able to power a variety of aircraft electrical loads. The characteristics of the AC power from the generator 104 can vary widely according to the application. For example, representative of the AC power characteristics include, but, are not limited to 480 V 60 Hz 3-phase AC, 120 V 400 Hz 3-phase AC, or the AC power from the generator 104 can have 3-phase power with a varying voltage of, for example, 200 to 300 V with a varying frequency, for example, of 380 to 600 Hz. In order to vary the voltage and frequency from the generator 104, the generator 104 can include a solid state frequency converter. The solid state frequency converter can include a rectifier circuit and an inverter circuit. The solid state frequency converter can be used to convert AC power into DC power of the desired voltage, and then, convert the DC power into the required AC frequency and voltage. Thus, the solid state frequency converter coupled to the generator 104 can maintain a constant voltage and frequency output during changing load conditions. When the generator 104 has a solid state frequency converter, the units 106, 108, 110, 112, 114, and 116 are optional depending on the circuits present in the solid state frequency converter.

Referring to FIG. 1, the AC power from the generator 104 is transformed in transformer 106. The transformer 106 may include one or more meters to measure the voltage and current. The voltage and current meters may be used for monitoring the operation of the transformer 106, and alarming if parameters are out of range, or alternatively, to control or shutdown the system when readings indicate a failure that may lead to damage. Suitable output power characteristics for the transformer 106 include 220/380 V to 277/480 V of the same frequency as the output of the generator 104. The ratio of the transformer 106 will be such that the voltage is in the 220/380 V to 277/480 V range. A transformer 106 is used to provide isolation so that the negative lead of the output of the rectifier 108 can be connected to ground. In some embodiments, the transformer can have a delta and a wye output. Both the delta and wye outputs can feed the rectifier 108.

The AC power from the transformer 106 is then rectified to DC power in rectifier 108. The rectifier 108 may include one or more meters to measure the voltage and temperature. The voltage and temperature meters may be used for monitoring the operation of the rectifier 108, and alarming if parameters are out of range, or alternatively, to control or shutdown the system when readings indicate a failure that may lead to damage. A suitable rectifier 108 can produce voltages in the range of 530 V to 670 V. However, the exact level will depend on the AC voltage coming into the rectifier. In some embodiments, the DC voltage coming from the rectifier 108 can be in the 530 V DC to 670 V DC.

In some embodiments, a variable speed engine 102 may be used. A variable speed engine has the advantage that the engine may be used to provide power to other equipment with different power requirements. As the rpm of the engine 102 changes, the voltage and frequency of the generator 104 will also change. In some embodiments, there may be a gearbox between the engine 102 and the generator 104. The use of a gearbox will depend on the rpm of the engine 102 and the necessary rpm of the generator 104 to produce the correct voltages and currents. In an aspect, the GPU 100 can have a variable speed engine 102 coupled to a variable frequency generator 104. The variable frequency generator 104 produces a variable AC input into the transformer 106. In some embodiments, the transformer 106 and rectifier 108 can be omitted when the generator 104 is a variable frequency generator. In some embodiments, the generator 304 is configured to vary the voltage from the range of 200 to 300 V. In some embodiments, the generator 304 is configured to vary the frequency from 380 to 600 Hz. When the generator 104 voltage or frequency varies with engine speed, the input voltage and frequency to the switcher 110 circuitry can also vary, however, the switcher 110 circuitry can create voltage and frequency waveforms to meet the desired characteristics, as explained herein.

In some embodiments, the engine 102/generator 104 combination can be omitted. In such cases, the power can either be supplied by connecting directly the utility power grid or a power source unconnected to the utility power grid. The transformer 106 can be a step-up or step-down transformer depending on the power source. From the rectifier 108, the DC power is fed to the switcher 110. The switcher 110 includes circuitry that can convert the rectified DC power into AC power and DC power, alternately and on demand to match the requirements of the particular aircraft.

A ground power unit 100 that can provide both AC power and DC power for aircraft has advantages over two separately provided power units. In some embodiments, the switcher 110 converts the DC power from the rectifier 108 into 3-phase, 115 V, 400 Hz AC power. Although 115 V, 400 Hz AC is used commonly in aircraft electrical systems, AC power can be produced with other characteristics to match the power needs of the aircraft or other power user. In some embodiments, the switcher 110 can convert the DC power from the rectifier 108 into 270 V DC power. Although 270 V DC is used commonly in aircraft electrical systems, DC power can be produced with other characteristics to match the power needs of the aircraft or other power user. In this disclosure 400 Hz AC and 270 V DC will be used as representative examples of AC and DC power requirements, with the understanding that the invention is not thereby limited.

Referring to FIG. 1, switch 118 connects the switcher 110 DC output to filter 116 which provides the 270 V DC power to the aircraft. Switch 120 connects the switcher 110 AC output to transformer 112 which then feeds into filter 114, which provides the 3-phase AC 400 Hz power to the aircraft. In some embodiments, an additional transformer 122 can be connected to the filter 114, followed by a rectifier 124 and filter 126 to produce a 28 V power source. The 400 Hz and 270 V outputs can be monitored for power, voltage, frequency, current, short-circuit status, as these measurements can be used in the control of the switcher 110 circuit, for example, to generate the appropriate voltage and frequency waveforms.

In some embodiments, switches 118 and 120 are configured to be operated to open or close through software or hardware or both in order to provide the desired AC or DC power from the switcher 110 depending on the state of the switches 118 and 120.

In some embodiments, closing the switch 118 will cause the switch 120 to open, and also command the sending of control signals that will cause the switcher 110 to produce the desired DC power. In some embodiments, closing the switch 120 will cause the switch 118 to open, and also command the sending of control signals that will cause the switcher 110 to produce the desired AC power.

The switcher 110 converts DC power from the rectifier 108 into DC power via a DC to DC converter circuit, or alternatively, the switcher 110 inverts DC power from the rectifier 108 into AC power by a pulse width modulated (PWM) inverter circuit in the switcher 110. Both the DC to DC converter circuit and the pulse width modulated inverter circuit in accordance with this disclosure are implemented with insulated gate bipolar transistor (IGBT) circuits. In some embodiments, the IGBT circuits are packaged into modules and are commercially available. An IGBT module includes a signal generation circuit using IGBTs. In some embodiments, the DC to DC converter circuit uses the IGBT circuits of the PWM inverter circuit. The same IGBT modules of the PWM inverter circuit are also configured into a circuit to be able to convert rectified DC power into DC power of the proper voltage. Thus, the switcher 110 is able to produce AC power of certain characteristics and DC power of certain characteristics. Programming a logic circuit produces the desired control voltage to the IGBT modules to produce the desired power output of the desired characteristics. Based on the parameters of the control voltage applied to the IGBT modules, various frequencies and voltage levels may be achieved using the circuitry of FIG. 2. Further, when the generator 104 voltage or frequency varies with engine speed, the switcher 110 can still create voltage and frequency waveforms of the desired characteristics.

In general, an IGBT module is considered as a switching device characterized by a high speed switching performance that has the gate voltage control of a power MOSFET and also has high voltage and current capacity of a bipolar transistor. There are various IGBT device structures available, any of which can be applied to this disclosure. A person of skill will be able to recognize any number of suitable IGBT modules from this disclosure. For example, the IGBT modules suitable for use in this disclosure are commercially available IGBT modules. IGBT modules can come in packages having a plurality of IGBT devices.

The pulse width modulated inverter circuit of this disclosure can include, for example, three, 2 in 1 IGBT modules, or alternatively, the pulse width modulated inverter circuit may be implemented with a single, 6 in 1 IGBT module. In addition, in one embodiment, two or more of the IGBT modules are configured in a DC to DC converter circuit. While the disclosure describes the use of three, 2 in 1 IGBT modules, it is to be appreciated that a single, 6 in 1 IGBT module may also be used. Other circuits using IGBT modules to produce both AC and DC power from the same circuitry components will become apparent to those skilled in the art based upon this disclosure and the FIGURES.

Figure 2:
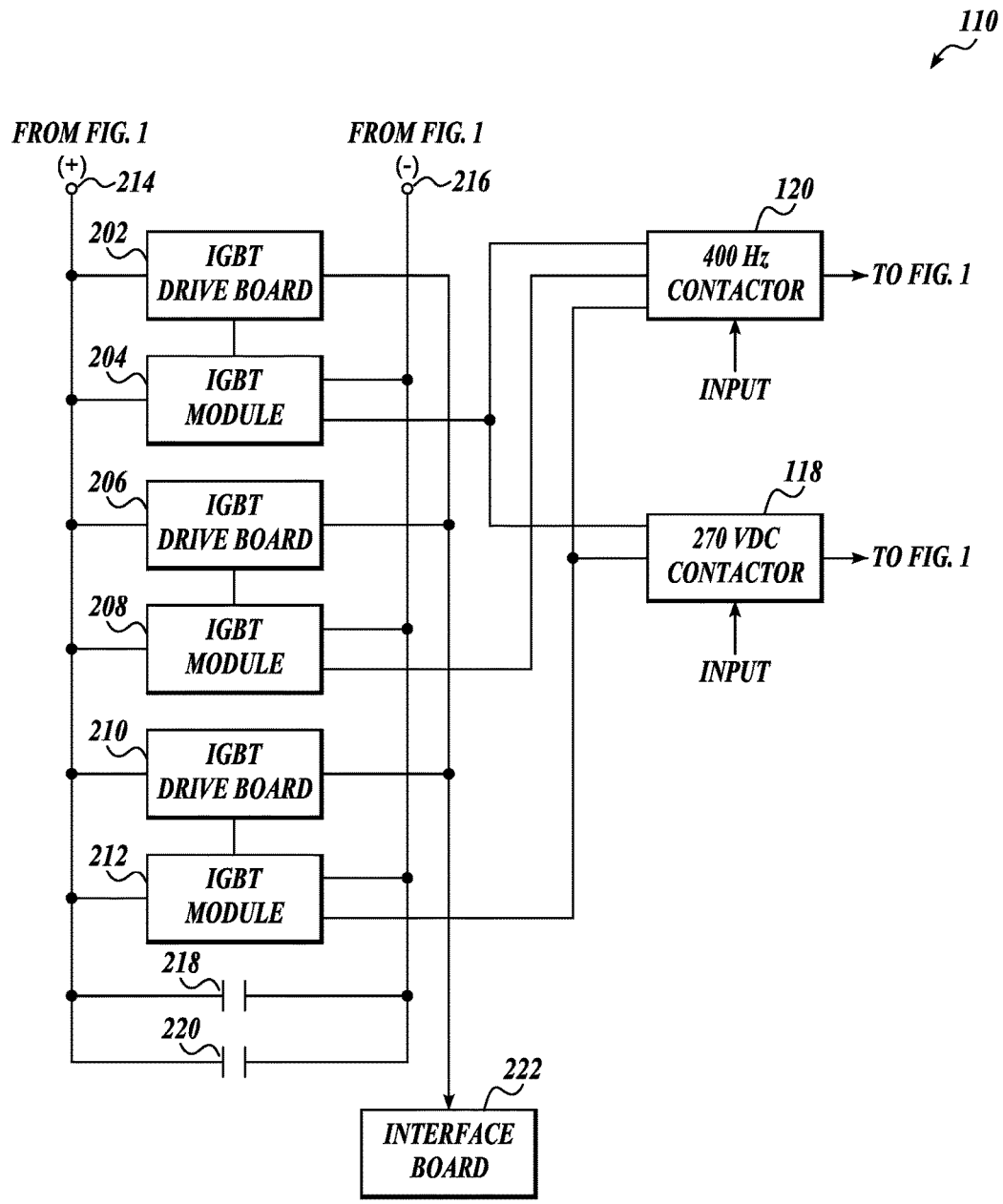
FIG. 2 is a schematic illustration of a switcher comprising a plurality of IGBT modules in accordance with an embodiment.

An embodiment of the switcher 110 circuit utilizing three, 2 in 1 IGBT, modules is shown schematically in FIG. 2. In some embodiments, the switcher 110 circuit includes a first 204, second 208, and third 212 IGBT module. The cathode terminal 214 from the rectifier 108 is connected in parallel to the first 204, second 208, and third 212 IGBT modules. The cathode terminal 214 from the rectifier 108 is connected in parallel to first 202, second 206, and third 210 IGBT drive boards. The anode terminal 216 from the rectifier 108 is connected in parallel to first 204, second 208, and third 212 IGBT modules.

Referring to FIG. 2, the switcher 110 circuit includes a first capacitor bank 218 and a second capacitor bank 220, each connected in parallel with the IGBT modules and to the cathode terminal 214 and the anode terminal 216 of the rectifier 108. In some embodiments, a capacitor bank can correct the power factor lag or phase shift in an AC power supply. In some embodiments, capacitor banks can increase the ripple current capacity of the power supply or the overall amount of stored energy in a DC power supply.

Referring to FIG. 2, the outputs from the first 204, second 208, and third 212 IGBT modules lead to switch 120 which has three individual contacts for each of the first 204, second 208, and third 212 IGBT modules. From the switch 120, the three individual outputs are fed to the transformer 112. From transformer 112, the AC power passes through the filter 114, and then, can be connected to the aircraft. The transformer 112 is used to provide electrical isolation from the switcher 110 to the 400 Hz output. The transformer 112 has a wye output to provide the required neutral for the 400 Hz 3-phase output power. In this usage, the 400 Hz output can provide 115 V, 400 Hz AC power.

Referring to FIG. 2, outputs from the first 204 and third 212 IGBT modules lead to switch 118 which has two individual contacts for the first 204 and third 212 IGBT modules. From the switch 118, the DC power passes through the filter 116, and then can be connected to the aircraft.

Referring to FIG. 2, each IGBT module is connected a corresponding IGBT drive circuit. In some embodiments, the IGBT drive circuits are commercially available. A person of ordinary skill will be able to select suitable IGBT drive circuits based on this disclosure. The IGBT drive circuits are packaged in modules or boards. The first IGBT module 204 is connected to IGBT drive board 202. The second IGBT module 208 is connected to IGBT drive board 206. The third IGBT module 212 is connected to IGBT drive board 210. The IGBT drive boards 202, 206, and 210 have circuitry to provide a low voltage control power to control the on and off switching of the IGBT modules. In some embodiments, IGBT modules are packaged with an IGBT drive board. In this disclosure, either IGBT drive boards packaged with the IGBT modules or as stand alone components may be used. Based on the control voltage signal, the power output of the IGBT modules can be made to have the desired characteristics. Each of the IGBT drive boards 202, 206, and 210 is further connected to the interface circuit 222. The interface circuit 222 can be packaged as a module or board. The interface circuit 222 is able to generate appropriate logic level signals in order so that the IGBT modules will create the AC and DC voltage and frequency waveforms.

The function of the IGBT drive boards 202, 206, and 210 is to convert logic level control signals from the interface circuit 222 into the appropriate voltage and current for the proper switching of the IGBT modules 204, 208, and 212. The function of the IGBT drive boards 202, 206, and 210 includes converting logic level control signals from the PWM 400 Hz and 270 V DC signal generation circuits in the interface circuit 222. In some embodiments, signal generation circuits include the use of three separate circuit boards. However, other circuit designs that use more or fewer components are possible.

The interface circuit 222 includes the signal generation circuits to control the output of the switcher 110. The inputs to the signal generation circuits of the interface board 222 include adjustment controls for adjusting the output voltages of the 400 Hz and 270 V DC output, feedback monitor signals that come from monitoring the output voltage and current of the 400 Hz and 270 V DC outputs, and signals to turn the signal generation circuits on and off. In this way, the generator 104 can vary the voltage and frequency, and the interface board 222 can produce the proper signals to achieve the 400 Hz and 270 V DC outputs.

The IGBT drive boards' circuitry can include small power MOSFETs or bipolar transistors to perform the conversion by alternately connecting the IGBT's gate to the appropriate on ($V_{ON}$) and off ($V_{OFF}$) voltages. The IGBT drive boards' 202, 206, and 210 circuitry can include optocouplers for voltage isolation. The optocouplers receive the logic level signals from the signal generation circuits of the interface board 222, electrically isolate the signals, and then convert them to +15 V and −10 V signals for the IGBT modules 204, 208, and 212.

A pulse wave modulated inverter requires that the IGBT modules switch states many times to produce the required frequency of 400 Hz. A pulse width modulated inverter circuit modifies the width of pulses in direct proportion to the voltage control signal. In the case of a DC to AC inverter circuit, the control voltage is a sinusoid of the desired frequency. Therefore, for inverting DC to AC, each of the three IGBT modules is controlled using a control voltage sinusoid of the desired frequency, but, the sinusoid control voltages are shifted (out of phase) 120 degrees apart.

When the switcher 110 circuit is used as a DC to DC converter, the DC to DC converter circuit can also use pulse wave modulation. In this case, the first 204 and third 212 IGBT modules are driven 180 degrees out of phase of each other, therefore, the interface circuit 222 can generate two pulse wave modulated outputs which are applied to the first 204 and the third 212 IGBT modules.

The switcher 110 may include one or more meters to measure the IGBT board status and temperature. The status sensors and temperature may be used for monitoring the operation of the switcher 111, and alarming if parameters are out of range, or alternatively, to control or shutdown the system when readings indicate a failure that may lead to damage.

Based on the disclosure and the figures, a nonexhaustive list of embodiments may include the following.

In an embodiment, a power unit 100 for producing both alternating current and direct current, comprises a switcher 110 connected to a direct current source 108, wherein the switcher 110 includes circuitry configured to produce both alternating current having first characteristics and direct current having second characteristics, wherein the circuitry comprises a plurality of insulated gate bipolar transistor circuits 204, 208, and 212, and drive circuits 202, 206, and 210, connected to the insulated gate bipolar transistor circuits.

In an embodiment of the power unit 100, the first characteristics include 3-phase, 400 hertz alternating current. The voltage can be 115/200 V.

In an embodiment of the power unit 100, the second characteristics include 270 V direct current.

In an embodiment of the power unit 100, the switcher 110 is connected to a rectifier 108, wherein the rectifier 108 converts alternating current into direct current supplied to the switcher 110.

In an embodiment of the power unit 100, the switcher 110 includes a first 204, second 208, and third 212 insulated gate bipolar transistor circuit, and the first, second, and third insulated gate bipolar transistor circuits are connected in parallel to a cathode 214 and anode 216 terminal of the rectifier 108.

In an embodiment of the power unit 100, the power unit 100 comprises an interface circuit 222 configured to apply a sinusoid control voltage to each of the insulated gate bipolar transistor circuits 204, 208, and 212, wherein the sinusoid is out of phase 120 degrees between the insulated gate bipolar transistor circuits.

In an embodiment of the power unit 100, the power unit comprises an interface circuit 222 configured to generate two pulse wave modulated control voltage outputs, which are applied 180 degrees out of phase of each other to two of the insulated gate bipolar transistor circuits 204, 208, and 212.

In an embodiment of the power unit 100, the power unit 100 further comprises a rectifier 108 connected to the switcher 110, wherein the rectifier 108 converts alternating current into direct current supplied to the switcher 110, and a transformer 106 connected to the rectifier 108.

In an embodiment of the power unit 100, the power unit 100, further comprises an engine 102 and generator 104 connected to the transformer 106.

In an embodiment of the power unit 100, the switcher circuitry 110 comprises a pulse wave modulated inverter.

In an embodiment, a power unit 100 comprises an engine 102 connected to a generator having a solid state variable frequency converter configured to produce alternating current and direct current.

In an embodiment, the power unit 100 comprises a variable frequency generator 104.

In an embodiment, the generator 104 is configured to vary the voltage from the range of 200 to 300 V.

In an embodiment, the generator 104 is configured to vary the frequency from 380 to 600 Hz.

In an embodiment, the switcher 110 is configured to receive input that varies in voltage or frequency or both voltage and frequency. However, the switcher 110 can produce the desired AC or DC power characteristics regardless of the varying voltage or frequency or both.

While illustrative embodiments have been illustrated and described, it will be appreciated that various changes can be made therein without departing from the spirit and scope of the invention.

The embodiments of the invention in which an exclusive property or privilege is claimed are defined as follows:

1. A power unit for producing both alternating current and direct current, comprising:
  a switcher connected to a direct current source, wherein the switcher includes circuitry configured to produce both alternating current having first characteristics and direct current having second characteristics, wherein the circuitry comprises a plurality of insulated gate bipolar transistor circuits and drive circuits connected to the insulated gate bipolar transistor circuits, wherein insulated gate bipolar modules configured to operate as a pulse wave modulated inverter to produce alternating current are also the same insulated gate bipolar modules configured to produce the direct current, wherein both the alternating current and direct current are output directly from combining the output of two or more of the insulated gate bipolar modules to a first and second switch to supply the alternating current and the direct current, respectively.

2. The power unit of claim 1, wherein the first characteristics include 3-phase, 400 hertz alternating current.

3. The power unit of claim 1, wherein the second characteristics include 270 V direct current.

4. The power unit of claim 1, wherein the switcher is connected to a rectifier, wherein the rectifier converts alternating current into direct current supplied to the switcher.

5. The power unit of claim 4, comprising a first, second, and third insulated gate bipolar transistor circuit, and the first, second, and third insulated gate bipolar transistor circuits are connected in parallel to a cathode and anode terminal of the rectifier.

6. The power unit of claim 1, comprising an interface circuit configured to apply a sinusoid control voltage to each of the insulated gate bipolar transistor circuits, wherein the sinusoid is out of phase 120 degrees between the insulated gate bipolar transistor circuits.

7. The power unit of claim 1, comprising an interface circuit configured to generate two pulse wave modulated control voltage outputs which are applied 180 degrees out of phase of each other to two of the insulated gate bipolar transistor circuits.

8. The power unit of claim 1, further comprising a rectifier connected to the switcher, wherein the rectifier converts alternating current into direct current supplied to the switcher, and a transformer connected to the rectifier.

9. The power unit of claim 8, further comprising an engine and generator connected to the transformer.

10. The power unit of claim 9, wherein the engine is a fixed speed engine.

11. The power unit of claim 9, wherein the engine is a variable speed engine.

12. The power unit of claim 9, further comprising a gearbox connecting the engine to the generator to increase generator rpms.

13. The power unit of claim 1, comprising a variable frequency generator.

14. The power unit of claim 13, wherein the generator is configured to vary the voltage from the range of 200 to 300 V.

15. The power unit of claim 13, wherein the generator is configured to vary the frequency from 380 to 600 Hz.

16. The power unit of claim 13, wherein the switcher is configured to receive input that varies in voltage or frequency or both voltage and frequency.

* * * * *